United States Patent
Lambropoulos

[11] Patent Number: 5,736,935
[45] Date of Patent: Apr. 7, 1998

[54] KEYLESS VEHICLE ENTRY AND ENGINE STARTING SYSTEM

[75] Inventor: George P. Lambropoulos, Grosse Pointe Woods, Mich.

[73] Assignee: TRW Inc., Lyndhurst, Ohio

[21] Appl. No.: 404,165

[22] Filed: Mar. 14, 1995

[51] Int. Cl.[6] .............. G06F 7/04; H04Q 1/00; G08C 19/00; B62D 45/00

[52] U.S. Cl. .............. 340/825.69; 340/825.72; 340/825.31; 364/424.099; 123/179.2; 123/179.3; 477/99

[58] Field of Search .............. 340/825.69, 825.31, 340/825.72; 364/424.1, 424.099; 123/179.2, 179.3, 179.4; 477/99

[56] References Cited

U.S. PATENT DOCUMENTS

| | | | |
|---|---|---|---|
| 4,670,746 | 6/1987 | Taniguchi et al. | 340/825.31 |
| 4,688,036 | 8/1987 | Hirano et al. | 340/825.69 |
| 4,763,121 | 8/1988 | Tomoda et al. | 340/825.54 |
| 4,829,296 | 5/1989 | Clark et al. | 340/825.31 |
| 4,868,915 | 9/1989 | Anderson, III et al. | 340/825.31 |
| 4,881,148 | 11/1989 | Lambropoulos et al. | 361/172 |
| 5,024,186 | 6/1991 | Long et al. | 123/179 B |
| 5,204,672 | 4/1993 | Brooks | 340/825.71 |

FOREIGN PATENT DOCUMENTS

| | | |
|---|---|---|
| 570103 | 11/1993 | European Pat. Off. . |
| 2706394 | 12/1994 | France . |
| 2051442 | 1/1981 | United Kingdom . |
| 2260361 | 4/1993 | United Kingdom . |

*Primary Examiner*—Michael Horabik
*Assistant Examiner*—Yonel Beaulieu
*Attorney, Agent, or Firm*—Tarolli, Sundheim, Covell, Tummino & Szabo

[57] ABSTRACT

A vehicle transceiver is employed in a keyless entry system for gaining entry into a vehicle and also for starting the vehicle's engine. The transceiver includes means for providing a start engine signal representative that the vehicle's engine is to be started, a brake signal representative that the vehicle's brake pedal has been depressed and a seat occupied signal representative that an occupant is located in the vehicle's driver seat. In response to these three signals, the transceiver transmits an interrogation signal to a remote transceiver which responds with a reply signal. The reply signal from the remote transceiver includes a security code that uniquely identifies the remote transceiver from similar remote transceivers. The vehicle's transceiver stores a prestored security code representative of a remote transceiver that may validly gain entry into the vehicle. The received security code from the remote transceiver and the prestored security code are compared and if a match takes place, the engine may be started.

10 Claims, 4 Drawing Sheets

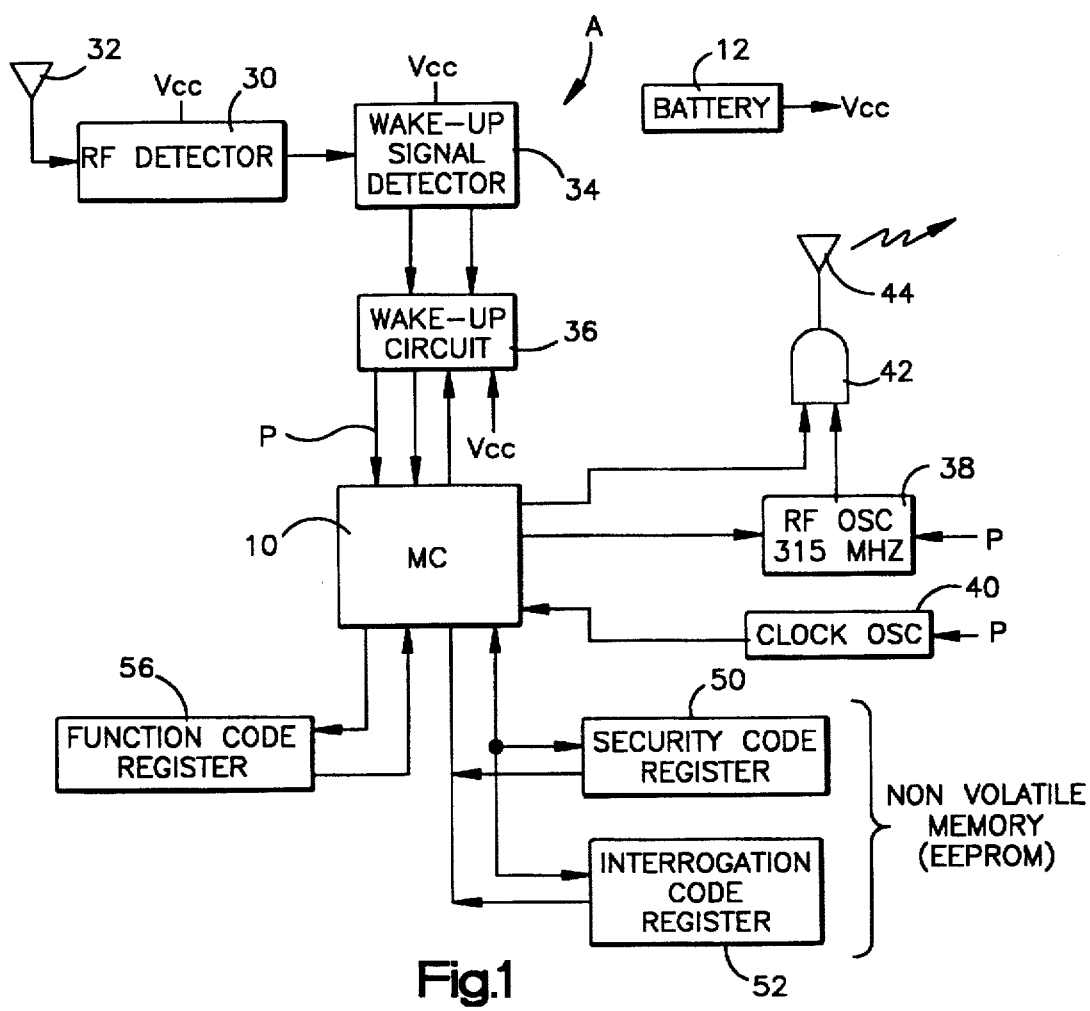
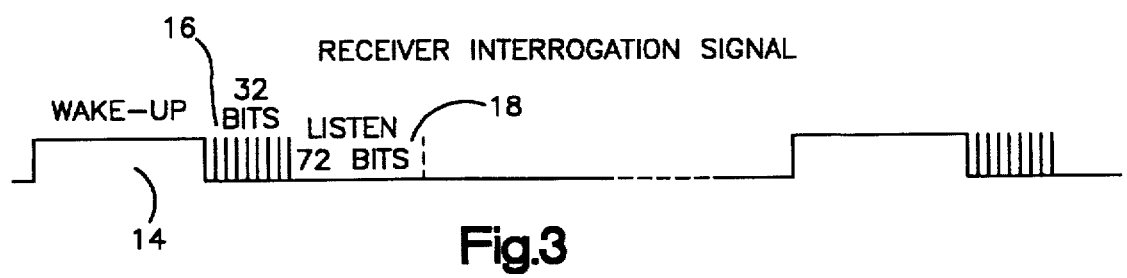
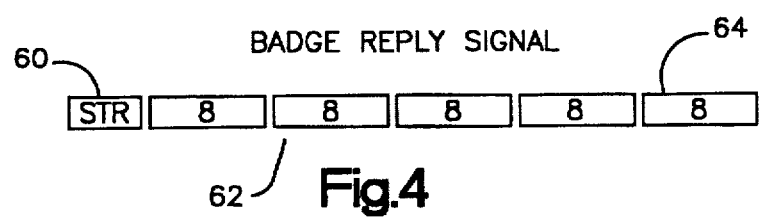

KEYLESS VEHICLE ENTRY AND ENGINE STARTING SYSTEM

FIELD OF THE INVENTION

The present invention relates to the art of remote keyless entry systems and, more particularly, to such systems for controlling the locking and unlocking functions of a vehicle door lock and the like and to improvements therein for also controlling other vehicle devices such as a vehicle starter motor for starting a vehicle's engine.

DESCRIPTION OF THE PRIOR ART

Keyless entry systems for motor vehicles are known in the art and typically control the locking and unlocking functions of a motor vehicle door lock. Such systems include a receiver mounted on a motor vehicle and a portable hand-held transmitter located remote from the receiver. The receiver has a memory which stores one or more security codes, each of which identifies a transmitter which is authorized to control entry into the vehicle and from which, therefore, the receiver will validly receive a transmitted signal. Each transmitter is provided with a plurality of manually actuatable switches, each representative of a control function to be performed, such as the unlocking of the vehicle door. The transmitter includes circuitry that responds to the actuation of one of the switches to transmit a digital signal. The transmitted digital signal includes a security code that uniquely distinguishes the transmitter from a plurality of similar transmitters, and a function code representative of the particular control function to be performed, such as the unlocking of a door. When a receiver receives such a digital signal, it compares the received security code with each stored security code to determine whether the code was generated by an authorized transmitter. If a match takes place, the receiver responds to the function code by causing performance of the control function requested, as, for example, by unlocking a vehicle door. A system as described above is disclosed in U.S. Pat. No. 4,881,148, the disclosure of which is herein incorporated by reference.

Another keyless entry system is disclosed in the U.S. Pat. No. 4,763,121 to Tomoda et al. That system operates vehicle devices such as door locks without the manual operation of pushbuttons located on remote transmitters. Instead, each remote device takes the form of a transponder or transceiver which receives demand signals that are automatically and periodically transmitted by a vehicle mounted transceiver. The remote transceiver then sends a reply signal to the vehicle transceiver with the reply signal including a preset code. At the vehicle transceiver, the preset code received from the remote transceiver is compared with a stored preset code and, if a match takes place, the vehicle doors are unlocked.

The U.S. Pat. No. 4,670,746 to Taniguchi et al. discloses a keyless entry system similar to that of the Tomoda patent discussed above but does not include automatic periodic transmission of a demand signal from the vehicle transceiver to the remote transceiver. Instead, it employs circuitry that responds to the manual actuation of a switch mounted on the vehicle to trigger the vehicle transceiver to transmit the demand signal. Moreover, the patent discloses a vehicle start-up switch which is manually actuated by an operator causing the vehicle transceiver to transmit a demand signal to the remote transceiver which then responds with a reply signal. The vehicle's transceiver receives the reply signal which includes a preset code and compares the preset code with a stored code and, upon detecting a match, it allows the starter motor to operate to start the vehicle's engine.

The prior art noted above does not provide a means for preventing the starting of the vehicle's engine when there is no operator or occupant located in the driver's seat and the brake pedal is not depressed. Consequently, if the remote transceiver is located either in the vehicle or, for example, in the pocket of the operator who might be outside but near the vehicle, then such a vehicle could be started by a child reaching over the driver's seat and depressing a vehicle start switch. This would cause the vehicle's engine to be started even though an occupant is not present in the vehicle's driver seat and the brake pedal is not depressed.

It is also noted that the prior art discussed above employs a vehicle transceiver that transmits a demand signal to which a remote transceiver responds by transmitting a coded reply signal. There is no provision in the vehicle transceiver to periodically transmit a demand signal or interrogation signal including an interrogation or identity code as opposed to an uncoded demand or interrogation signal in order to uniquely identify the vehicle transceiver from similar vehicle transceivers. Also, there is no teaching that such a remote transceiver have means to compare a received interrogation code with a prestored interrogation code and, if a match takes place, to then transmit the coded reply signal.

SUMMARY OF THE INVENTION

In accordance with one aspect of the invention, a vehicle transceiver is provided for use in a keyless entry system for a motor vehicle for normally controlling the locking and unlocking functions of a door lock or the like. The vehicle transceiver also provides a brake signal representative that the vehicle's brake pedal has been depressed by an operator, a seat occupied signal representative that an occupant is located in the vehicle's driver seat and a start engine signal representative that the vehicle's engine is to be started. The transceiver further includes control means responsive to the occurrence of the start engine signal and the brake signal and a seat occupied signal to transmit an interrogation signal from the vehicle. The vehicle transceiver further includes means for receiving a reply signal from a remote transceiver wherein the reply signal includes a security code that uniquely identifies the transmitting remote transceiver from that of a plurality of similar remote transceivers. The received security code is compared with the stored security code and when a match takes place between the security codes an engine start enabling signal is provided for use in enabling the starting of the vehicle's engine.

In accordance with another aspect of the invention, the system employs a vehicle transceiver having means for transmitting a coded interrogation signal that uniquely identifies the vehicle transceiver from that of similar transceivers together with means for receiving a coded reply signal and responding thereto for causing performance of a vehicle function. In this aspect of the invention, each remote transceiver includes means for receiving an interrogation signal and comparing the received interrogation code therein with a prestored interrogation code and, when a match takes place, transmitting a coded reply signal requesting performance of a vehicle function.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and wherein:

FIG. 1 is a schematic block diagram illustrating a portable transceiver employed in the present invention;

FIG. 3 is an illustration of voltage with respect to time illustrating the waveform of an interrogation signal transmitted by the vehicle transceiver;

FIG. 4 is an illustration of voltage with respect to time illustrating the waveform of a reply signal transmitted by a portable remote transceiver;

FIG. 6, which includes

DESCRIPTION OF PREFERRED EMBODIMENT

Figure 2:
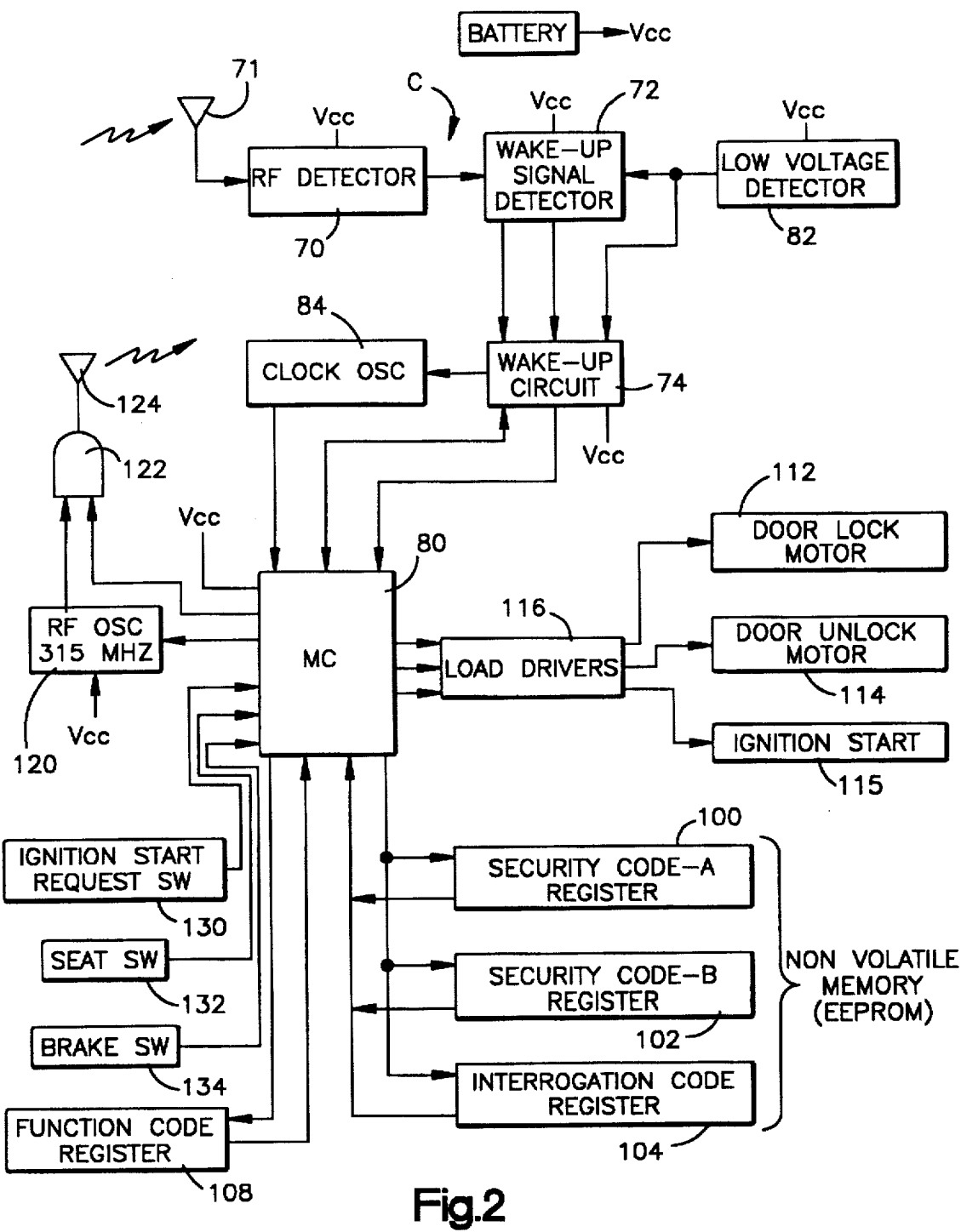
FIG. 2 is a schematic block diagram of a vehicle transceiver in accordance with the present invention.

Reference is now made to the drawings wherein the showings are for purposes of illustrating a preferred embodiment of the invention only, and not for the purpose of limiting same. The keyless entry system described herein may include one or more remote, portable transceivers which communicate with a vehicle transceiver to achieve remote control of the vehicle's door lock and unlock mechanisms. The portable transceivers may include transceivers A and B (only the circuitry of transceiver A being described herein in detail). Each takes the form as illustrated with respect to transceiver A in FIG. 1. This portable transceiver, sometimes referred to hereinafter as an interactive badge, may comprise a printed circuit located on a flat plastic base. The transceiver may have an appearance of a typical credit card and may be kept in the operator's purse or wallet or the like. A miniature battery is employed for providing operating power.

Each of the remote transceivers A and B is assigned a security code unique to the particular transceiver. Each vehicle transceiver C is mounted on a vehicle and will permit entry into the vehicle of an operator carrying a transceiver which is coded with a proper security code. In the example being given, transceivers A and B are provided with proper security codes SCA and SCB, respectively, which will permit entry into the vehicle in which is mounted transceiver C. As will be brought out in greater detail below, transceiver C periodically transmits an interrogation signal over a range of approximately two to four meters. The interrogation signal includes an interrogation code that uniquely distinguishes vehicle transceiver C from other vehicle transceivers. If an operator carrying a portable transceiver enters the range of operation of transceiver C, then the interrogation signal will be received by the transceiver.

Assume that an interrogation signal has been received by transceiver A. At transceiver A, the received interrogation code is compared with a prestored interrogation code and, if a match takes place, then transceiver A sends a reply signal back to the vehicle transceiver C. This reply signal includes a security code that uniquely identifies transceiver A, distinguishing it from all other similar transceivers, together with a function code requesting a function, such as the unlocking or opening of the vehicle door. This reply signal is received at the vehicle transceiver C where the received security code is compared with a prestored security code to ensure that the reply is from an access-authorized transceiver. If the received and prestored security codes match, then transceiver C responds to the function code by performing the requested functions, such as unlocking the vehicle door.

Once the operator has gained entry into the vehicle, the operator may actuate a keyless start switch to start the vehicle's engine. If the operator has depressed the brake pedal and is sitting in the driver's seat, then, upon the depression of the start switch, the transceiver C will transmit a second or start engine interrogation signal. This will be received by the operator's transceiver A which will again compare the received interrogation code with the prestored interrogation code and, if a match takes place, transmit a reply to the vehicle transceiver C. The transceiver C will again compare the security code of the received reply signal with the prestored security code. If a match takes place, the transceiver C will respond by initiating the starting of the vehicle's engine.

Having briefly described the operation of the keyless entry and vehicle engine starting system, attention is now directed to the following more detailed description of a portable transceiver and a vehicle transceiver constructed in accordance with the present invention.

Portable Transceiver

Each portable transceiver takes the form of transceiver A as illustrated in FIG. 1. Transceiver A includes a microcomputer 10 having appropriate internal PROMs, EEPROMs, and RAMs programmed to perform the functions of the system, as hereinafter described, and having sufficient I/O terminals for interconnection with input and output peripherals. A battery 12 which may take the form of a long life miniature battery, such a lithium battery, provides a DC voltage $V_{cc}$ to the various circuits shown in FIG. 1.

The microcomputer also includes a number of internal registers which are used during program execution for storage and manipulation of data and instructions. Individual storage locations in RAM or EEPROM are also sometimes used as such registers. Whereas these registers are internal of the microcomputer 10, several of the registers are illustrated in FIG. 1 external to the microprocessor to assist in the explanation of the invention. The illustrated registers include a security code register 50 and an interrogation code register 52, both of which are preferably located in the EEPROM memory. An additional register illustrated in FIG. 1 is function code register 56. Register 56 is preferably located in RAM. The security code register 50 contains a code which uniquely identifies transceiver A. The security code is fixed in the security code register 50 by the manufacturer. This may be accomplished in the manner described in U.S. Pat. No. 4,881,148. The security code preferably takes the form of four eight bit bytes. The security code is generated at the point of manufacture by means of an algorithm which has the capability of generating numbers in a random, but not repeatable, fashion. Thus, each security code is unique.

The interrogation code register 52 contains a code which is twenty bits in length and provides an identification that uniquely distinguishes the vehicle transceiver C from other, similar vehicle transceivers.

The function code register 56 serves to temporarily store the function code to be transmitted as part of the transmitted signal from the transceiver A to the vehicle transceiver C. The function code is an eight bit byte wherein each bit corresponds to a particular function which may be requested, such as unlocking of the vehicle door. Other types of function coding may of course be used.

As will be discussed in greater detail hereinafter, the vehicle transceiver C (FIG. 2) periodically transmits a radio frequency (RF) interrogation signal over a range on the order of two to four meters from the vehicle. The RF interrogation signal is an RF carrier signal which is keyed by a baseband digital interrogation signal having a pattern as shown in FIG. 3. In FIG. 3, a signal "high" level indicates that the RF carrier signal is keyed "on" and a "low" level indicates that the RF carrier signal is keyed "off". As shown in the waveform of FIG. 3, the digital control signal includes a wake-up portion 14, an interrogation portion 16 and a listen portion 18. The RF interrogation signal has a duration on the order of 355 milliseconds and is repeated every 1.95 seconds. The wake-up portion 14 is simply the carrier signal modulated at the baud rate but without any data carried thereon. The wake-up portion 14 serves to wake up the receiving portable transceiver, such as transceiver A.

The wake-up portion, which may have a duration on the order of 303 milliseconds, is followed by 32 bits of information transmitted over an interval on the order of 16 milliseconds. This 32 bits of information includes 20 bits of vehicle identification information followed by a four bit request code identifying the type of request being transmitted. This may be followed by a checksum code for purposes of providing verification of the accuracy of the transmitted signal, in a known manner.

The transceiver A includes an RF detector 30 which is tuned to the carrier frequency of the RF interrogation signal transmitted by the transceiver C. The carrier frequency is on the order of 315 MHz. As the interrogation signal is received at the transceiver's receiving antenna 32, the detector 30 demodulates the signal to recover the baseband digital interrogation signal, and passes the recovered signal to a wake-up signal detector 34. The wake-up signal detector 34 checks to see if the BAUD rate is proper, and if so, it activates a wake-up circuit 36 for supplying power P to the transceiver's microcomputer 10 as well as to oscillators 38 and 40.

The data in the recovered interrogation signal (FIG. 3) is clocked into the microcomputer 10. The data includes the 32 bit interrogation portion 16 which, as discussed hereinbefore, includes twenty vehicle identification bits. After the full 32 bits are received and stored in a register in the microprocessor, the microprocessor compares the interrogation or identification code with the code stored in the interrogation code register 52. If a match then, under program control, the transceiver A transmits a badge reply signal (see FIG. 4).

The carrier oscillator 38 has a nominal frequency of 315 MHz and is employed for transmitting the reply signal from the remote transceiver A back to the vehicle transceiver C, as will be discussed in detail hereinafter. This is under the control of the microcomputer 10. The reply signal (see FIG. 4) includes coded information in the form of binary 1 and binary 0 signals which are superimposed on the 315 MHz carrier signal. The carrier signal supplied by oscillator 38 is modulated by gating it through AND gate 42. The modulated signal is coupled to a transmitting antenna 44 for broadcast. The reply signal transmitted by the transceiver A has a range on the order of two to four meters.

The badge reply signal, as shown in FIG. 4, includes a start portion 60 (four bits), a security code portion 62 (four eight bit bytes) and a function code portion 64 (eight bits). The security code is taken from security code register 50 and the function code from register 56. The function code stored in register 56 will depend upon the four bit request code contained in the interrogation signal. If the request code requests an "open door" reply code, then the function code will be the code which requests unlocking of the doors. If the request code requests a "start car" reply code, then the function code will be the code which requests starting of the car. The start code is similar to wake-up portion 14 of the interrogation signal.

Vehicle Transceiver

The vehicle transceiver C (FIG. 2) includes an RF detector 70 tuned to the reply signal frequency of 315 MHz so that, as the signal is received at the transceiver's receiving antenna 71 during the listening period (FIG. 2), the detector 70 allows the first portion 60 (FIG. 4) to pass to a wake-up signal detector 72 which checks to see if the BAUD rate is proper. If the BAUD rate is proper, detector 72 activates the wake-up circuit 74 which powers-up the circuit by supplying operating voltage $V_{cc}$, such as 5.0 volts, to the transceiver's microcomputer 80. The operating voltage is monitored by a low voltage detector 82 to permit operation of the circuitry so long as the voltage does not drop below a selected level.

The recovered base band data from the received signal is supplied to the microcomputer 80. The microcomputer 80, as in the case of the microcomputer 10 in the transceiver A, includes a plurality of internal memories including PROMs, RAMs, and EEPROMs and a number of internal registers. The microcomputer is programmed to perform the functions to be described in greater detail hereinafter.

Some of the internal memory locations of the microcomputer 80 are illustrated in FIG. 2 to assist in the description of the invention. These includes registers 100, 102 and 104, which are all preferably part of the programmable but nonvolatile memory (EEPROM). Register 100 stores a security code identifying a transceiver (e.g., transceiver A) authorized to gain access to the vehicle. The code set into register 100 may be placed in the memory at the factory or may be programmed in the field in the manner described in U.S. Pat. No. 4,881,148. This code is 32 bits in length and is divided into four eight bit data bytes.

As it may be desirable for the vehicle transceiver C to recognize more than one authorized portable transceiver, a second security code register 102 is provided, identical to register 100. Register 102 will store a different security code identifying a second, different, authorized portable transceiver (e.g., transceiver B). An example of an application for security codes assigned to two different portable transceivers is a vehicle having two drivers authorized to use the vehicle. There may be several valid drivers, such as various members of a family unit, and in such case each member carries a different portable transceiver with its own unique security code. At transceiver C, various security code registers (there may be two, as illustrated, or more) each store a security code for a respective one of the authorized portable transceivers.

In addition to the security code registers 100 and 102, the vehicle transceiver C includes an interrogation code register 104 which contains identification data which uniquely identifies the vehicle transceiver C, distinguishing it from similar transceivers mounted in other vehicles. In the example being described, the interrogation code is twenty bits in length, and register 104 is sized accordingly.

The transceiver C also includes a function code register 108. This register provides temporary storage of the function code portion of the digital signal received from a portable transceiver, such as transceiver A. If transceiver C receives a valid digital signal from transceiver A, then the microcomputer 80 will decode the function code in register 108 and perform a door lock function, such as lock or unlock a vehicle door byway of suitable motors 112 and 114 driven by load drivers 116. This process will now be described in greater detail.

The vehicle transceiver C periodically transmits an interrogation signal as illustrated in FIG. 3. That signal includes data in the form of a series of binary signals, superimposed on a 315 MHz carrier provided by oscillator 120. The carrier signal is modulated by gating it through art AND gate 122 under control of the microcomputer. The resulting amplitude modulated signal is transmitted from the transmitting antenna 124 in a known manner.

Transceiver A receives the interrogation signal processes it in the manner already described and, if the interrogation code received from transceiver C matches that which is prestored at the register 52 in transceiver A, transmits a reply signal back to transceiver C. Upon receipt of the reply signal, transceiver C compares the reply security code with the codes stored in registers 100 and 102. That reply signal includes a function code which is clocked into the microcomputer 80 and stored in the function code register 108. The function code now received as part of the reply signal requests that the vehicle door be unlocked. Thus, when an operator carrying transceiver A enters the range of the interrogation signal transmitted by transceiver C, the doors of the vehicle automatically unlock.

To summarize the process described so far, the transceiver C periodically transmits an interrogation signal, searching for an operator with a valid interactive, portable transceiver and who desires entry into the vehicle. The interrogation signal includes twenty identification bits together with four request code bits which identify sixteen different requests. The request code is now a code which requests that a portable transceiver send a reply code asking for the doors to be unlocked. The transceiver A, in response to the received interrogation signal, transmits a badge reply signal as shown in FIG. 4. That reply signal includes a function code, see function code portion 64 in FIG. 4, which requests that the vehicle door be unlocked. In response thereto, the transceiver C activates the door unlock motor 114 to unlock the vehicle's doors. The operator may now enter into the vehicle.

In accordance with the present invention, the operator, having gained entry into the vehicle containing the vehicle transceiver C, is able to start the vehicle's engine without using a conventional mechanical key. Instead, the operator starts the vehicle engine by actuating a suitable pushbutton or the like mounted at a convenient location, such as on the steering column or on the vehicle dashboard. An ignition start request switch 130 is actuated in response to actuation of a pushbutton or the like by an operator to provide an ignition start request signal to the microcomputer 80. The microcomputer is programmed to respond to such an ignition start request signal by first checking whether the vehicle's driver seat is occupied and whether the vehicle's brake pedal has been depressed. To achieve these functions, a seat switch 132 is provided and which responds to an operator located on the driver's seat to provide a "seat occupied" signal to the microcomputer 80. The seat switch may be a simple weight sensitive mechanical switch or may, instead, be a non-contact electronic sensor such as an infrared or ultrasonic sensor. Also, a brake switch 134 is provided and which responds to depression of the vehicle's brake pedal to provide a signal indicating that the brake pedal has been depressed. The brake signal is also supplied to the microcomputer 80. When the microcomputer 80 detects that the foregoing conditions are satisfied (meaning that a driver is present and has his foot on the brake), the microcomputer 80 transmits a second or "start engine" interrogation signal.

The second interrogation signal is transmitted by transceiver C and is received by the remote transceiver A. The second interrogation code is similar to the first, except that the request code now asks for a reply containing the function code for starting the engine, rather than the function code for opening the doors. Transceiver A will again compare the received interrogation code with a prestored interrogation code. If a match takes place, then transceiver A transmits a reply signal containing the "start engine" function code. The reply signal is received by transceiver C. The security code contained in the received reply signal is compared with the prestored security code from registers 100 and 102. If a match takes place and if the proper function code is also found, then the microcomputer 80 in transceiver C enables the ignition start circuit 115 permitting starting of the vehicle's engine.

After the operator has finished using the vehicle and exits therefrom, the transceiver C will revert to its normal operation of automatically and periodically transmitting an interrogation signal (see FIG. 3) which is effective over a range within approximately two meters from the vehicle. As long as a proper reply signal is received, no action is taken by transceiver C. As the operator possessing the transceiver walks away from the vehicle beyond the effective range of the interrogation signal, then no reply signal is sent back to the transceiver C. The microcomputer 80 in the transceiver C responds to the lack of reply by activating the door lock motor 112 to lock the vehicle doors. The transceiver C will continue to periodically transmit an interrogation signal awaiting a valid reply from a remote transceiver, such as transceivers A and B to allow entry into the vehicle. Following receipt of a valid reply, transceiver C will unlock the doors and then permit or block the starting of the vehicle engine in the manner described above.

Figure 5:
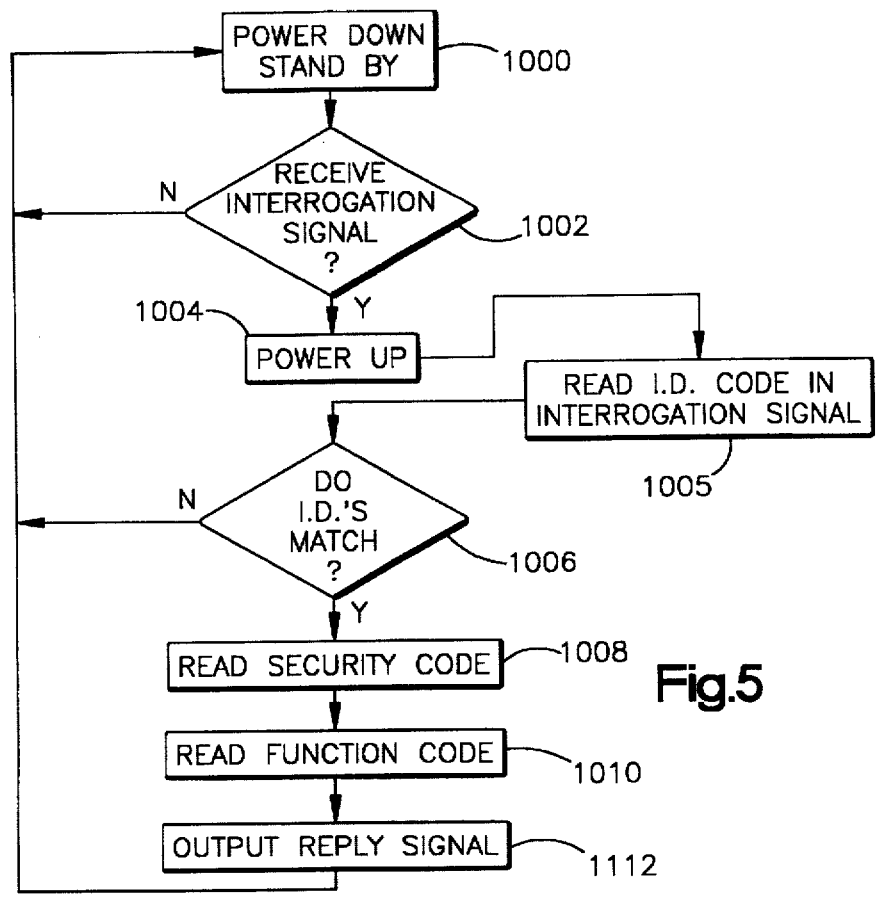
FIG. 5 is a flow diagram illustrating the operation of the remote transceiver herein.

Reference is now made to FIG. 5 which illustrates a flow chart showing the manner in which the microcomputer 10 in the portable transceiver of FIG. 1 is programmed in accordance with the present invention. Initially in accordance with step 1000, the remote transceiver is in a power-down, standby condition awaiting reception of an interrogation signal from a vehicle transceiver, such as the vehicle transceiver C illustrated in FIG. 2. Upon receipt of such a signal, as indicated by step 1002, the vehicle transceiver is powered-up in step 1004. Then, in step 1005, the interrogation or ID code modulated into the received signal is read. In step 1006, the received ID code or interrogation code in the interrogation signal is compared with the interrogation code stored in register 52 to determine if the codes match. If the codes do not match, the procedure returns to the power-down, standby condition at step 1000. If the codes match, then the program operation shifts to step 1008, wherein the security code is read from register 50. Thereafter, in step 1112, the remote transceiver outputs a reply signal including the security code and a function code selected from ROM in accordance with the request code found in the interrogation signal. Thereafter, the remote transceiver reverts to its power standby condition awaiting receipt of another interrogation signal from a vehicle transceiver.

Figure 6A:
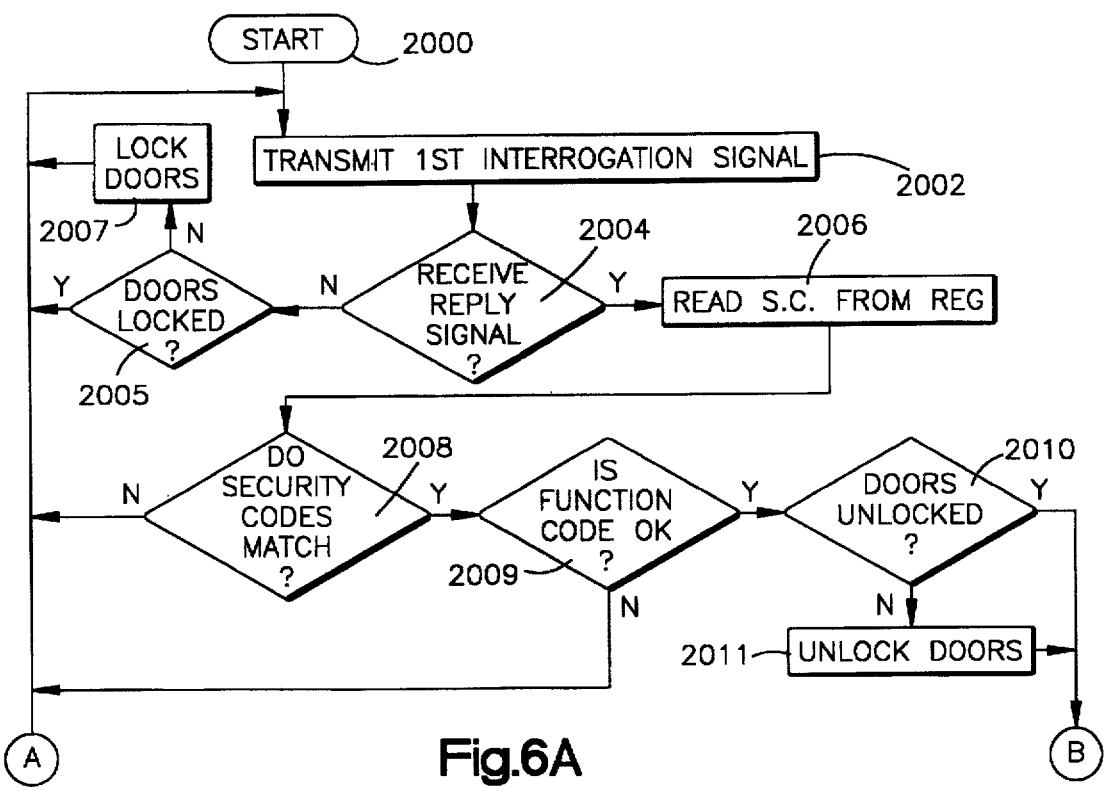
FIGS. 6A and 6B, is a flow diagram illustrating the operation of the vehicle transceiver herein.
Figure 6B:
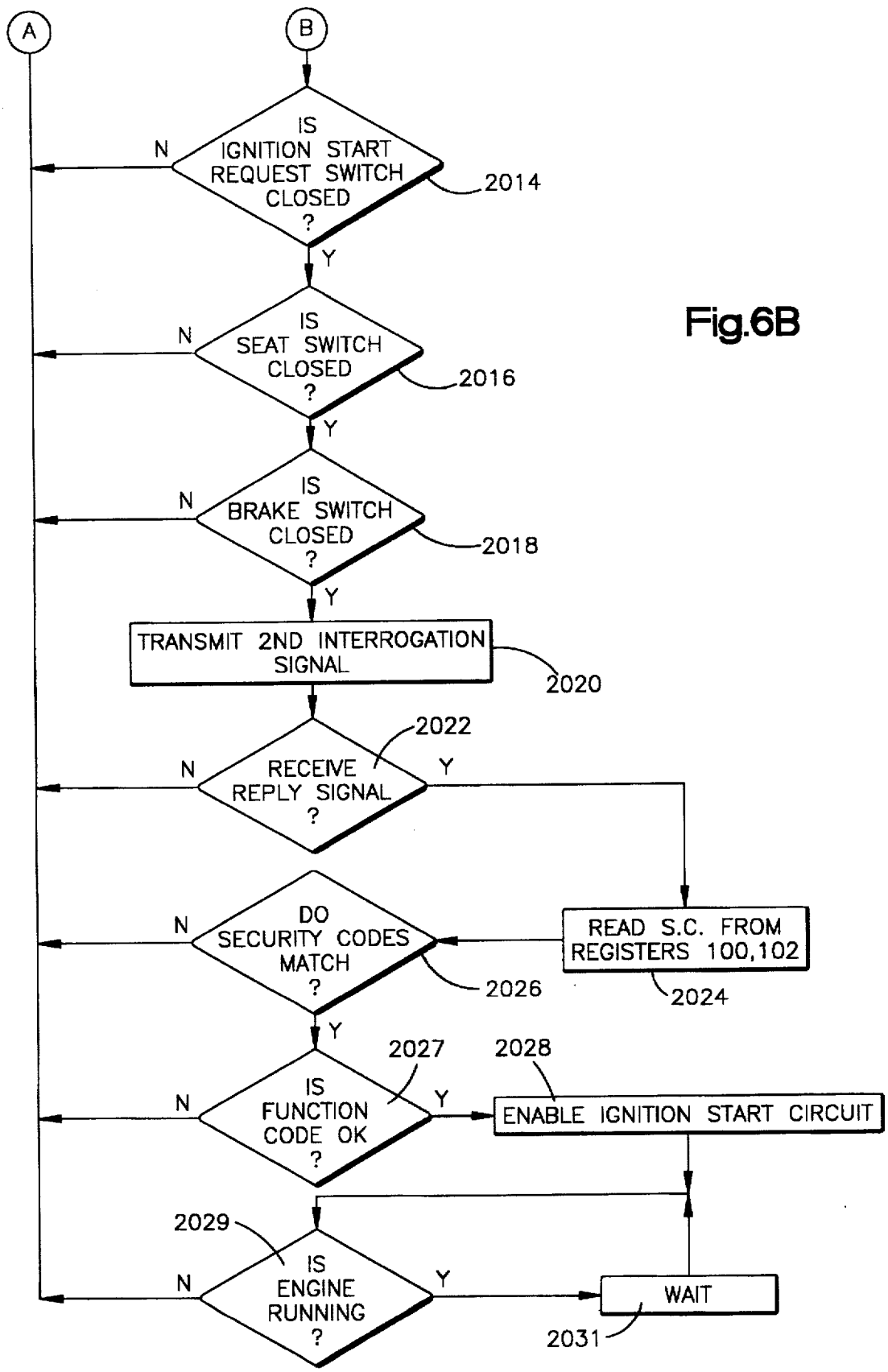

Reference is now made to FIGS. 6A and 6B, which illustrate the manner in which the transceiver C is programmed. Initially, in step 2000, the transceiver is in a start condition. The vehicle transceiver transmits an interrogation signal in step 2002. As shown herein, the transmission of interrogation signals is automatic and periodic, taking place in each case upon the expiration of an interval determined by an internal timer within microcomputer 10. Each time an interrogation signal is transmitted, the vehicle transceiver shifts to step 2002 to await the receipt of a reply signal from a remote portable transceiver, such as the transceiver A in FIG. 1. If no reply signal is received within the predetermined waiting period, then, from step 2004, the microcomputer will jump to step 2005 to check whether the vehicle doors are locked. If not, then in step 2007, the doors of the vehicle are locked. More specifically, a signal is sent to door lock motor 112 through load drivers 116. The microcomputer will also, in step 2005, store the status of the locks (locked). On subsequent passes through step 2005, the door lock motor 112 will only be energized if the lock status indicates that the doors have been unlocked. From steps 2005 and 2007 the program flow Jumps back to step 2002. In step 2002 the microcomputer will wait until expiration of the dwell period between transmissions. The vehicle transceiver will then transmit another interrogation signal, etc.

If a reply signal is received during the "listen" period, the microcomputer will, in step 2006, read the prestored security codes from register 100 (or from register 102). In step 2008, the received security code embedded in the reply signal is compared with each of the prestored security codes from registers 100 and 102. If a match does not take place, then the program returns to step 2002 to await the lapse of the interval timer and thus the initiation of another interrogation signal transmission. If a match does take place, the microcomputer checks in step 2009, whether the current function code is also proper. Then, in step 2010, the computer checks to see if the door is already unlocked. If not, the microcomputer shifts to step 2011, and activates the door unlock motor 114 to unlock a vehicle door. After the doors are thus unlocked, the microcomputer proceeds to step 2014 to check the status of the ignition start switch.

In step 2014, the microcomputer 80 in the vehicle transceiver responds to the closure of the ignition start request switch 130 to thereafter determine, in steps 2016 and 2018, whether the seat switch 132 and the brake switch 134 are also closed. If all three switches 130, 132 and 134 have been closed, then in step 2020, the transceiver C transmits a second, or "start engine" interrogation signal.

This second interrogation signal will be received by the remote transceiver A which will again compare the interrogation code in the received interrogation signal with the prestored interrogation code from register 52. If a match takes place, the transceiver A will transmit a reply signal including a security code and the proper "start engine" function code.

At the vehicle transceiver, in step 2022, a determination is made as to whether or not a reply signal has been received. If a reply has been received, then, in step 2024, the microcomputer in the vehicle transceiver C reads the prestored security code in register 100 (or from register 102) in the same manner as in step 2006 above.

In step 2026, the received security code is compared to the prestored security code. If there is a match, the computer jumps to step 2027, where the function code is checked. If the function code is the proper "start engine" function code, then, in step 2028, the ignition start circuit 115 is enabled to start the vehicle's engine. In step 2029 the microcomputer determines whether the engine is running. The microcomputer ceases all interrogation activities in step 2031 as long as the engine is running. When the engine is turned off, the microcomputer returns to step 2002 (FIG. 6A) to resume normal periodic interrogation activities.

From the above description of the invention, those skilled in the art will perceive improvements, changes and modifications. Such improvements, changes and modifications within the skill of the art are intended to be covered by the appended claims.

Having described the invention, the following is claimed:

1. A vehicle transceiver for use in a keyless entry system and for use in starting a vehicle's engine and including:
    means for providing a start engine signal representative that the vehicle's engine is to be started;
    means for providing a brake signal representative that the vehicle's brake pedal has been depressed;
    means for providing a seat occupied signal representative that an occupant is located in the vehicle's driver seat;
    means responsive to the occurrence of said start engine signal and said brake signal and said seat occupied signal for transmitting an interrogation signal to a remote transceiver;
    means for receiving a reply signal from a remote transceiver wherein said reply signal includes a security code which uniquely identifies said remote transceiver;
    means for storing a prestored security code representative of said remote transceiver;
    means for comparing said prestored security code and said received security code and, if a match takes place, initiating action for enabling the starting of said vehicle's engine.

2. A vehicle transceiver as set forth in claim 1 wherein said means for storing a prestored security code includes means for storing a plurality of prestored security codes each uniquely identifying an associated remote transceiver.

3. A vehicle transceiver as set forth in claim 2 wherein said means for comparing includes means for sequentially comparing said received security code with said plurality of prestored security codes to determine if a match takes place with any one of said prestored security codes.

4. A vehicle transceiver as set forth in claim 1 wherein said interrogation signal includes an interrogation code uniquely identifying said vehicle transceiver.

5. A vehicle transceiver as set forth in claim 4 wherein said means for storing a prestored security code includes means for storing a plurality of prestored security codes each uniquely identifying an associated remote transceiver.

6. A vehicle transceiver as set forth in claim 5 wherein said means for comparing includes means for sequentially comparing said received security code with said plurality of prestored security codes to determine if a match takes place with any one of said prestored security codes.

7. A vehicle transceiver as set forth in claim 1 wherein said interrogation signal is a second interrogation signal and wherein said vehicle transceiver includes transmitting means including means for transmitting a first interrogation signal and said responsive means for transmitting said second interrogation signal.

8. A vehicle transceiver as set forth in claim 7 wherein said first interrogation signal includes an interrogation code uniquely identifying said vehicle transceiver.

9. A vehicle transceiver as set forth in claim 7 wherein said second interrogation signal includes an interrogation code uniquely identifying said vehicle transceiver.

10. A vehicle transceiver as set forth in claim 7 wherein each said interrogation signal includes an interrogation code uniquely identifying said vehicle transceiver.

* * * * *